United States Patent [19]

Basu

[11] Patent Number: 5,401,036

[45] Date of Patent: Mar. 28, 1995

[54] BRUSH SEAL DEVICE HAVING A RECESSED BACK PLATE

[75] Inventor: Prithwish Basu, Pawtucket, R.I.

[73] Assignee: EG & G Sealol, Inc., Cranston, R.I.

[21] Appl. No.: 35,072

[22] Filed: Mar. 22, 1993

[51] Int. Cl.⁶ .................................... F16J 15/447
[52] U.S. Cl. ................................................ 277/53
[58] Field of Search ............... 277/51, 53, 188 R; 415/173.5, 174.5

[56] References Cited

U.S. PATENT DOCUMENTS

| | | | |
|---|---|---|---|
| 4,202,554 | 5/1980 | Snell | 277/53 |
| 5,029,875 | 7/1991 | Spain et al. | 277/53 X |
| 5,066,024 | 11/1991 | Reisinger et al. | 277/53 |
| 5,071,138 | 12/1991 | Mackay et al. | 277/53 X |
| 5,106,104 | 4/1992 | Atkinson et al. | 277/53 X |
| 5,108,116 | 4/1992 | Johnson et al. | 277/53 |
| 5,201,530 | 4/1993 | Kelch et al. | 277/53 |

FOREIGN PATENT DOCUMENTS

| | | | |
|---|---|---|---|
| 0293140 | 11/1988 | European Pat. Off. | 277/53 |
| 2021210 | 11/1979 | United Kingdom . | |
| 1598926 | 9/1981 | United Kingdom . | |
| 2258277 | 2/1993 | United Kingdom | 277/53 |
| 1523768 | 11/1989 | U.S.S.R. | 277/53 |
| 2014951 | 9/1992 | WIPO | 277/53 |

Primary Examiner—William A. Cuchlinski, Jr.
Assistant Examiner—John L. Beres
Attorney, Agent, or Firm—Finnegan, Henderson, Farabow, Garrett & Dunner

[57] ABSTRACT

A brush seal device for sealing a high pressure area from a low pressure area. The brush seal device comprises an annular retaining plate having a first side facing the high pressure area and a second side opposite the first side, and an annular back plate having a first side facing the low pressure area and a second side opposite the first side, the second side of the back plate having an outer peripheral portion and an inner peripheral portion. A plurality of bristles are between the second side of the retaining plate and the outer peripheral portion of the second side of the back plate such that they extend inwardly from the outer peripheral portion of the second side of the back plate. The inner peripheral portion of the second side of the back plate has a recessed surface formed therein to inhibit the plurality of bristles from contacting the inner peripheral portion of the second side of the back plate.

43 Claims, 7 Drawing Sheets

BRUSH SEAL DEVICE HAVING A RECESSED BACK PLATE

BACKGROUND OF THE INVENTION

1. Field of the Invention

The present invention relates to brush seals for sealing high pressure fluid areas from low pressure fluid areas, the sealed fluids being gas or liquid.

2. Description of the Related Art

Over the last decade, brush seals have emerged to be a very promising technology for sealing high pressure areas from low pressure areas such as those found in gas turbine engines. Indeed, there is a substantial reduction, e.g., an order of magnitude, in brush seal leakage flow over the present day technology of labyrinth seals, the main disadvantage associated with labyrinth seals being that the clearance of the seal around the shaft tends to increase appreciably over time due to shaft excursions and thermal growth. The resulting increase in parasitic leakage can cause as much as 17 percent loss in power and 7.5 percent increase in specific fuel consumption in the case of engines.

Typically, brush seals inhibit the flow of a gas (or liquid) in a stream along a shaft. The gas (or liquid) is sealed, for example, within a machine housing and has a system pressure. The area outside of the sealed machine housing toward which the sealed gas will tend to leak has a discharge pressure, the system pressure being greater than the discharge pressure.

Such a brush seal generally comprises an annular retaining plate, an annular back plate, and a plurality of bristles secured between the retaining plate and back plate. The bristles extend inwardly from the outer peripheral edges of the retaining plate such that their free ends run against the rotating shaft to thereby seal the system pressure from the discharge pressure.

While the system pressure acts primarily over the entire free length of the bristles, the discharge pressure acts over the overhang area of the bristles. An imbalance in these two axial forces results in the bristles loading against the back plate with a high mechanical contact force along the length of the bristles. It should be noted that the contact force will also be generated at the interfaces between the bristles by varying degree.

Frictional forces thus engendered by the contact force at various interfaces between the bristles and the back plate and between the bristles themselves give rise to bristle hysteresis with any radial movement of the shaft. For example, during a radial excursion of the shaft, the bristles are forced radially outward. Subsequently, when the shaft withdraws, the bristles do not drop back down on the shaft unless the differential between the system pressure and the discharge pressure is decreased to a small value. In fact, even a few psig pressure differential across the seal can prevent free radial movement of the bristles. This bristle hysteresis leaves a large gap between the bristles and the shaft, and hence, causes an appreciable increase in leakage along the shaft. Further, the leakage increase is likely to be cumulative every time a shaft excursion takes place in different directions.

Another detrimental effect of the above-described mechanical contact force is that it increases the radial stiffness of the bristles. Because the bristles are prevented from moving freely in the radial direction by the contact force, the effective stiffness of the bristles increases with rise in the differential between the system pressure and the discharge pressure. Typically, an order of magnitude increase in bristle stiffness is seen with a differential pressure rise of 60 psig from zero level. As a result of this bristle stiffening, the sliding interface between the bristles and the shaft experiences significantly higher contact load at a higher differential pressure for a given radial interference or an applied radial excursion of the shaft. This, in turn, results in accelerated wear of the bristles and degradation of the surface of the shaft.

SUMMARY OF THE INVENTION

Features and advantages of the invention will be set forth in part in the description which follows, and in part will be apparent from the description, or may be learned by practice of the invention. The objectives and other advantages of the invention may be realized and attained by means of the elements and combinations particularly pointed out in the written description, claims and appended drawings.

To achieve the foregoing objects, and in accordance with the purposes of the invention as embodied and broadly described here, a brush seal device for sealing a high pressure area from a low pressure area is provided, the brush seal device comprising an annular retaining plate having a first side facing the high pressure area and a second side opposite the first side, and an annular back plate having a first side facing the low pressure area and a second side opposite the first side, the second side of the back plate having an outer peripheral portion and an inner peripheral portion. A plurality of bristles are between the second side of the retaining plate and the outer peripheral portion of the second side of the back plate such that they extend inwardly from the outer peripheral portion of the second side of the back plate. The inner peripheral portion of the second side of the back plate has a recessed surface formed therein to inhibit the plurality of bristles from contacting the inner peripheral portion of the second side of the back plate.

In another aspect of the invention, the recessed surface formed in the second side of the back plate is contoured to increase in depth toward an inner peripheral edge of the back plate.

In yet another aspect of the invention, the brush seal further comprises a flexible annular member disposed between the plurality of bristles and the second side of the back plate

BRIEF DESCRIPTION OF THE DRAWINGS

The accompanying drawings, which are incorporated in and constitute a part of the specification, illustrate several embodiments of the invention and, together with the general description given above and the detailed description of the embodiments given below, serve to explain the principles of the invention. In the drawings.

DESCRIPTION OF THE PREFERRED EMBODIMENTS

Figure 1:
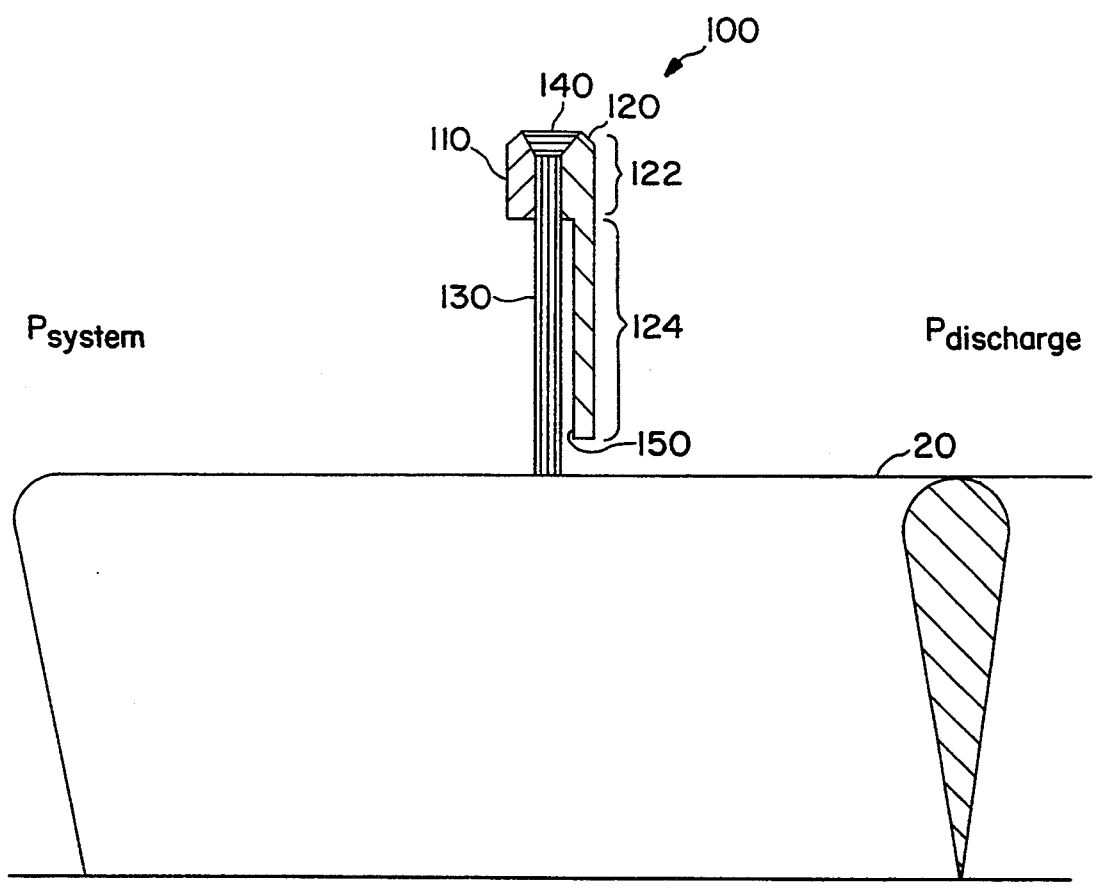
FIG. 1 is a fragmentary side view of one side of a shaft and a radial cross-section of a brush seal device in accordance with a first embodiment of the present invention.

Reference will now be made in detail to the presently preferred embodiments of the invention, as illustrated in the accompanying drawings, in which like reference characters designate like or corresponding parts throughout the several drawings.

Figure 2:
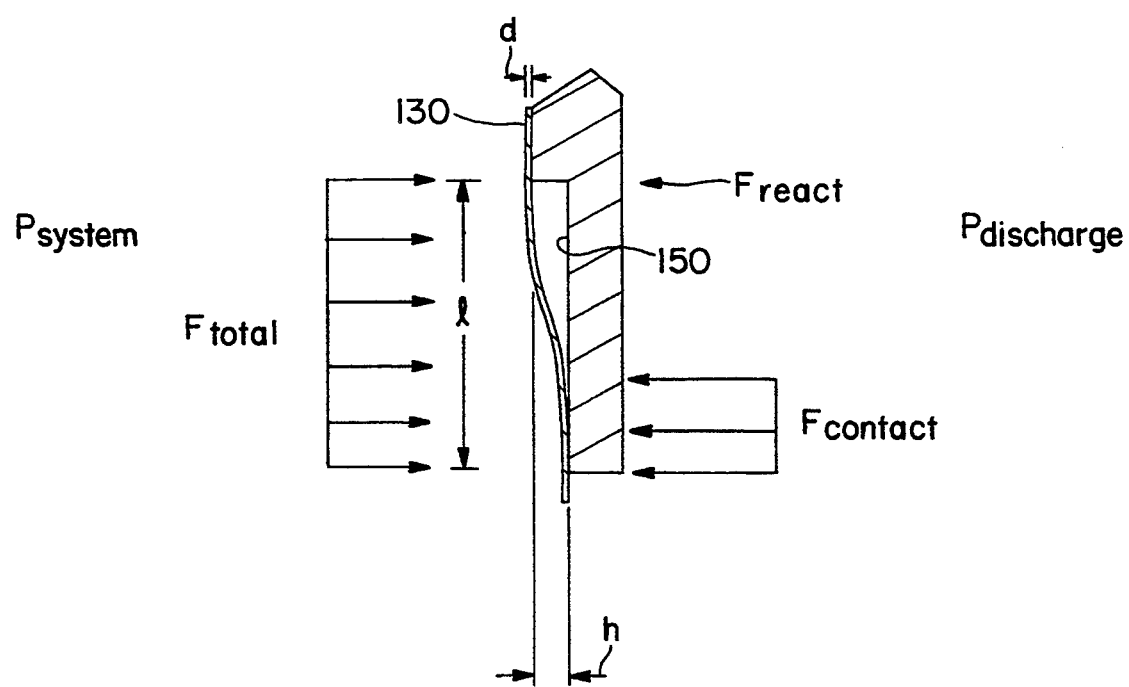
FIG. 2 is a free body force diagram of the brush seal device of FIG. 1.

A first embodiment of the present invention will now be described with reference to FIGS. 1 and 2. As shown in FIG. 1, there is provided a brush seal device 100 comprising an annular retaining plate 110 having a first side facing a system pressure I -202 -408-4000 $P_{system}$ and a second side opposite the first side, and an annular back plate 120 having a first side facing a discharge pressure $P_{discharge}$ and a second side opposite the first side. The second side of the back plate 120 has an outer peripheral portion 122 and an inner peripheral portion 124, and a plurality of bristles 130 are located between the second side of the retaining plate 110 and the outer peripheral portion 122 of the second side of the back plate 120. The bristles 130 can be secured between the second side of the retaining plate 110 and the outer peripheral portion 122 of the second side of the back plate 120 by, for example, a weld 140, or other means known in the art, depending on the materials used for the retaining plate 110, back plate 120, and bristles 130.

While both the second side of the retaining plate 110 and the outer peripheral portion 122 of the back plate 120 are preferably substantially planar, the inner peripheral portion 124 of the second side of the back plate 120 has a recessed surface 150 formed therein. The recessed surface 150 is preferably substantially planar and, as will be explained in detail below, inhibits the bristles 130 from contacting the inner peripheral portion 124 of the back plate 120.

Preferably, both the retaining plate 110 and the back plate 120 comprise materials that have a high yield strength at high temperatures. For example, the retaining plate 110 and the back plate 120 can comprise a nickel based alloy such as Inconel ® manufactured by Inco Alloys International. It should be understood that the composition of the retaining plate 110 and the back plate 120 can be varied depending on the particular application with which the brush seal device 100 is to be used. It should also be understood that, although not shown in FIG. 1, the retaining plate 110 and the back plate 120 can be formed from a single member.

Preferably, the retaining plate 110 and back plate 120 are configured such that a distance between an outer peripheral edge of the retaining plate 110 and an inner peripheral edge of the retaining plate 110 is substantially equal to or less than the length of the outer peripheral portion 122 of the second side of the back plate 120. Further, the retaining plate 110 and outer peripheral portion 122 of the second side of the back plate 120 preferably extend only a small portion of the entire length of the bristles 130.

The bristles 130 extend inwardly from the outer peripheral portion 122 of the second side of the back plate 120 such that their free ends run against a shaft 20 to thereby seal the system pressure $P_{system}$ from the discharge pressure $P_{discharge}$ along the shaft 20. Further, the bristles 130 are preferably angled relative to respective radii of the retaining plate 110 and back plate 120 so as to have a circumferential component of direction relative to a direction of rotation of the shaft 20.

To retain their shape, especially at higher temperatures, the bristles 130 preferably comprise a high temperature nickel based alloy such as Haynes 25 ® or Haynes 214 ® manufactured by Haynes International. The bristles 130, however, can comprise other materials to suit a particular application.

Operation of the brush seal device 100 of FIG. 1 will now be explained with reference to FIG. 2. A pressure differential Δp (not shown) between the system pressure $P_{system}$ and the discharge pressure $P_{discharge}$ results in a total force $F_{total}$ along the free length l of the bristle 130. More specifically, assuming there are $N_{row}$ number of bristle rows and a uniform pressure drop across each of the rows, the load distribution or total force $F_{total}$ exerted on a single one of the bristles 130 by the pressure differential Δp is calculated as follows:

$$F_{total} = (\Delta p / N_{row}) \times d \times l \qquad \text{Eqn. 1.0}$$

where d is the diameter of the bristle 130 and l, again, is the free length of the bristle 130.

In response to the total force $F_{total}$, a mechanical reaction force $F_{react}$ is exerted by the outer peripheral portion 122 of the second side of the back plate 120 at the bristle root. Until the free end of the bristle contacts the recessed surface 150, the reaction force $F_{react}$ is equal to the total force $F_{total}$ and, hence, the ratio $F_{react}/F_{total}$ is 1.0. However, once the pressure differential Δp between the system pressure $P_{system}$ and the discharge pressure $P_{discharge}$ increases beyond a threshold value, such that the bristle comes in contact with the recessed surface 150, a mechanical contact force $F_{contact}$ is exerted by the recessed surface 150 at the interface between the bristle 130 and the recessed surface 150, thereby decreasing the ratio $F_{react}/F_{total}$. The above threshold pressure differential at which the bristles 130 begin to contact the recessed surface 150 depends on the particular design, but is typically about 30–70 psig. As described above, $F_{contact}$ is primarily responsible for producing bristle hysteresis and stiffening effects during radial excursions of the shaft 20. Thus, by minimizing $F_{contact}$ (or maximizing $F_{react}$), these effects can be minimized.

By increasing the depth h of the recessed surface 150, $F_{contact}$ can be made as low as possible. However, as the depth h of the recessed surface 150 increases, the stresses on the bristle root will also increase. Optimization of the design of the brush seal device 100 for a given set of operating conditions can be accomplished by finite element analysis. Such an analysis can provide a design which achieves the lowest value of $F_{contact}$ without exceeding the allowable bristle stress limit for any particular pressure differential and temperature.

Essential parameters for optimization of the design of the brush seal 100 are the depth h of the recessed surface 150 from the second side of the back plate 120, the diameter d of the bristles 130, the number of rows $N_{row}$ of the bristles 130, and the free length l of the bristles 130. It is contemplated that values for these parameters can be varied to suit a particular application.

For example, the depth h can be about 0.005–0.120 inch (preferably about 0.020–0.050 inch), and each of the bristles 130 can have a diameter d of about 0.002–0.020 inch (preferably about 0.002–0.010 inch) and a free length l of about 0.200–0.800 inch (preferably about 0.300–0.600 inch). Further, the bristles 130 can be arranged into about 10–60 rows (preferably about 20–50 between the second side of the retaining plate 110 and the second side of the back plate 120 with a pack width of the bristles 130 being about 0.020–0.150 inch (preferably about 0.025–0.100 inch). With regard to the pack width of the bristles 130, it should be appreciated that with an increased pack width (conventional brush seals typically have a pack width of about 0.025 inch), there will be a reduction in pressure drop across each row of the bristles 130, thereby further increasing the ratio of $F_{react}$ to $F_{total}$.

It is envisioned that the brush seal device 100 of FIG. 1 having the foregoing characteristics can handle pressure differentials of at least 100 psi, and possibly up to 200 psi. Thus, the brush seal device 100 would be well suited for use in a wide variety of aircraft engines, compressors, and pumps.

Figure 3:
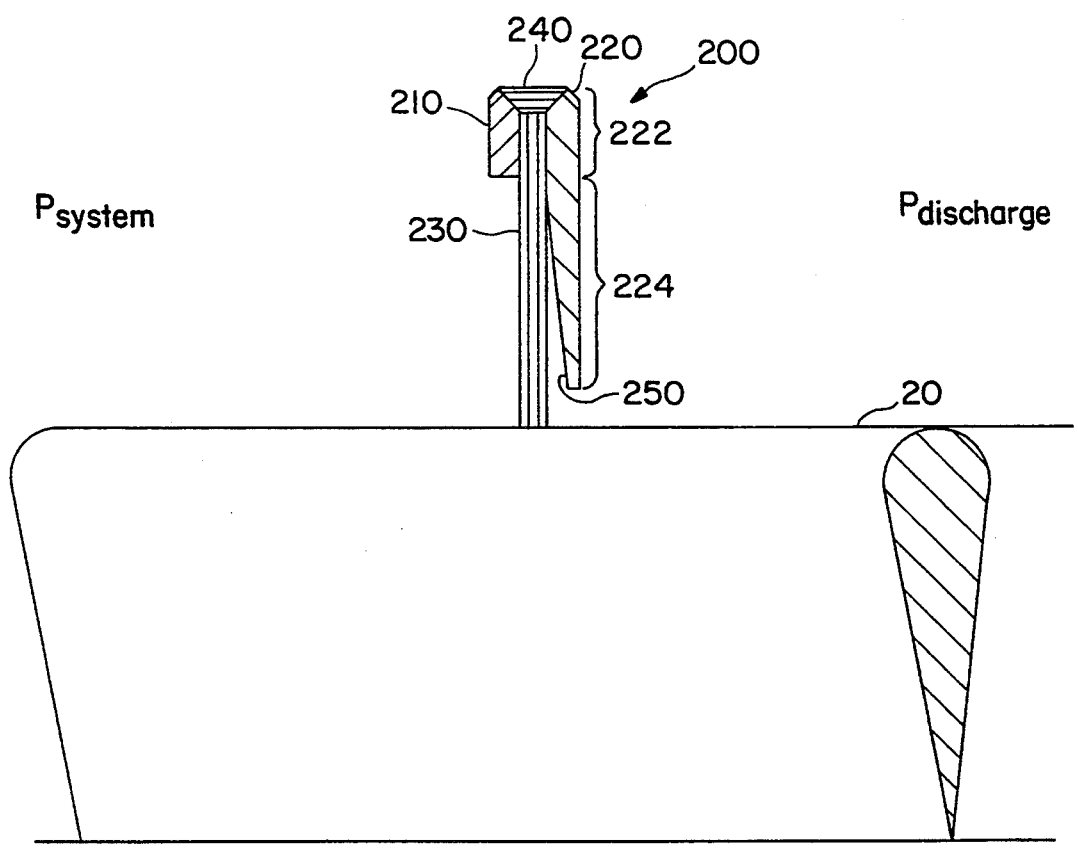
FIG. 3 is a radial cross-section of a brush seal device in accordance with a second embodiment of the present invention.

A second embodiment of the present invention will now be described with reference to FIG. 3. As shown in FIG. 3, a brush seal device 200 is provided comprising an annular retaining plate 210 having a first side facing a system pressure $P_{system}$ and a second side opposite the first side, and an annular back plate 220 having a first side facing a discharge pressure $P_{discharge}$ and a second side opposite the first side. The second side of the back plate 220 has an outer peripheral portion 222 and an inner peripheral portion 224. A plurality of bristles 230 are secured at a weld 240 between the second side of the retaining plate 210 and the outer peripheral portion 222 of the second side of the back plate 220.

Preferably, the materials used for forming the retaining plate 210, back plate 220, bristles 230, and weld 240 are the same as those used in the first embodiment. Likewise, the dimensions of the retaining plate 210, back plate 220, and bristles 230 are preferably the same as those in the first embodiment.

As in the first embodiment, while both the second side of the retaining plate 210 and the outer peripheral portion 222 of the back plate 220 are preferably substantially planar, the inner peripheral portion 224 of the second side of the back plate 220 has a recessed surface 250 formed therein. However, unlike the recessed surface 150 of the first embodiment, the recessed surface 250 of the second embodiment is contoured to increase in depth toward an inner peripheral edge of the back plate 220.

Preferably, the recessed surface 250 is designed to have a contoured profile based on the elastic curve of the bristles 230 at the operating pressure differential thereby maximizing the reaction force $F_{react}$. Important factors in designing the shape of the recessed surface 250 include the radius of curvature r of the back plate at the bristle root and the depth h of the recessed surface 250 at the inner peripheral edge of the back plate 220. It should be understood that the shape of the recessed surface 250 between the bristle root and the inner peripheral edge of the back plate 220 can be optimized using finite element analysis.

Preferably, the radius of curvature r is chosen such that the last row of bristles does not touch the recessed surface 250 for low pressure differentials, e.g., 30–50 psig. As the pressure differential increases, however, the region of contact between the toward the inner peripheral edge of the back plate 220, thereby distributing the root reaction force $F_{react}$ over a finite region.

Figure 4A:
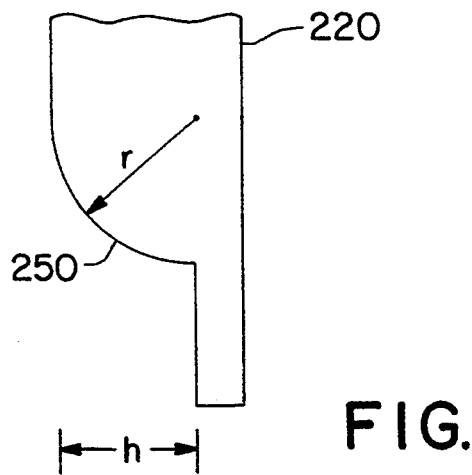
FIGS. 4(A), 4(B), 4(C), 4(D), 4(E) and 4(F) are cross-sectional views of various contoured profiles of the brush seal back plate of FIG. 3.
Figure 4B:
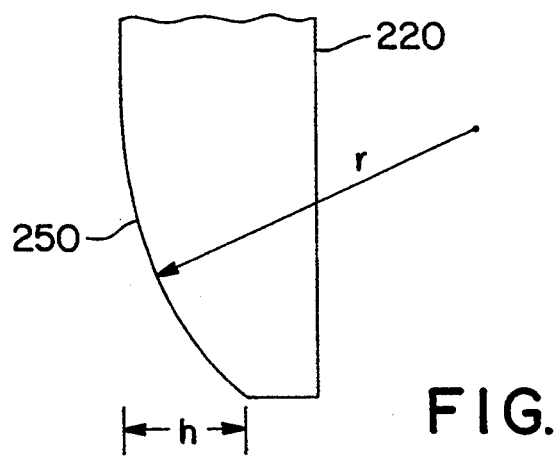
Figure 4C:
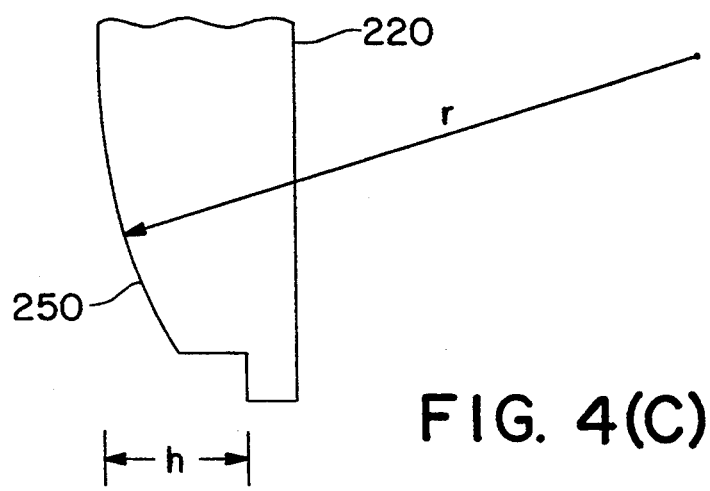

FIGS. 4(A), 4(B), and 4(C) illustrate several possible designs for the recessed surface 250. As shown by these designs, both the radius of curvature r of the contour at the bristle roots and the depth h of the recessed surface 250 at the inner peripheral edge of the back plate 220 can vary. For example, the radius of curvature r of the contour at the bristle roots can vary between 0–2 inches, and the depth h of the recessed surface 250 at the inner peripheral edge of the back plate 220 can vary from 0.005–0.120 inch. It should be noted that the depth h is preferably chosen such that the bristles 230 barely touch the recessed surface 250 at operating pressure differential, thereby reducing $F_{contact}$ to almost zero level.

By contouring the recessed surface 250 in this manner, reaction forces at the roots of the bristles 230 are not concentrated at a single point, but are spread over a finite region of the bristles, thereby reducing the maximum stress. Thus, the brush seal device 200 can accommodate higher pressure differentials than the first embodiment.

Figure 4D:
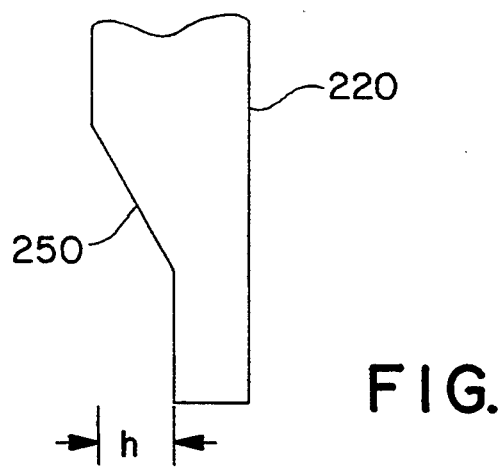
Figure 4E:
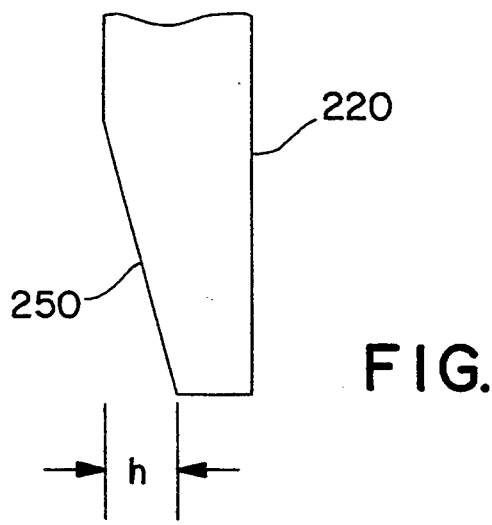
Figure 4F:
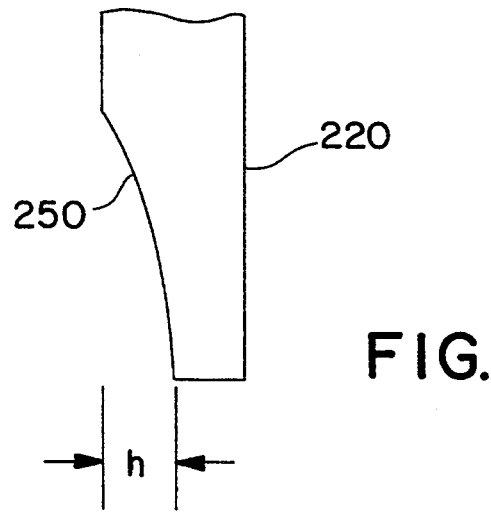

Some other possible designs for the recessed surface 250 are shown in FIGS. 4(D), 4(E) and 4(F).

Figure 5A:
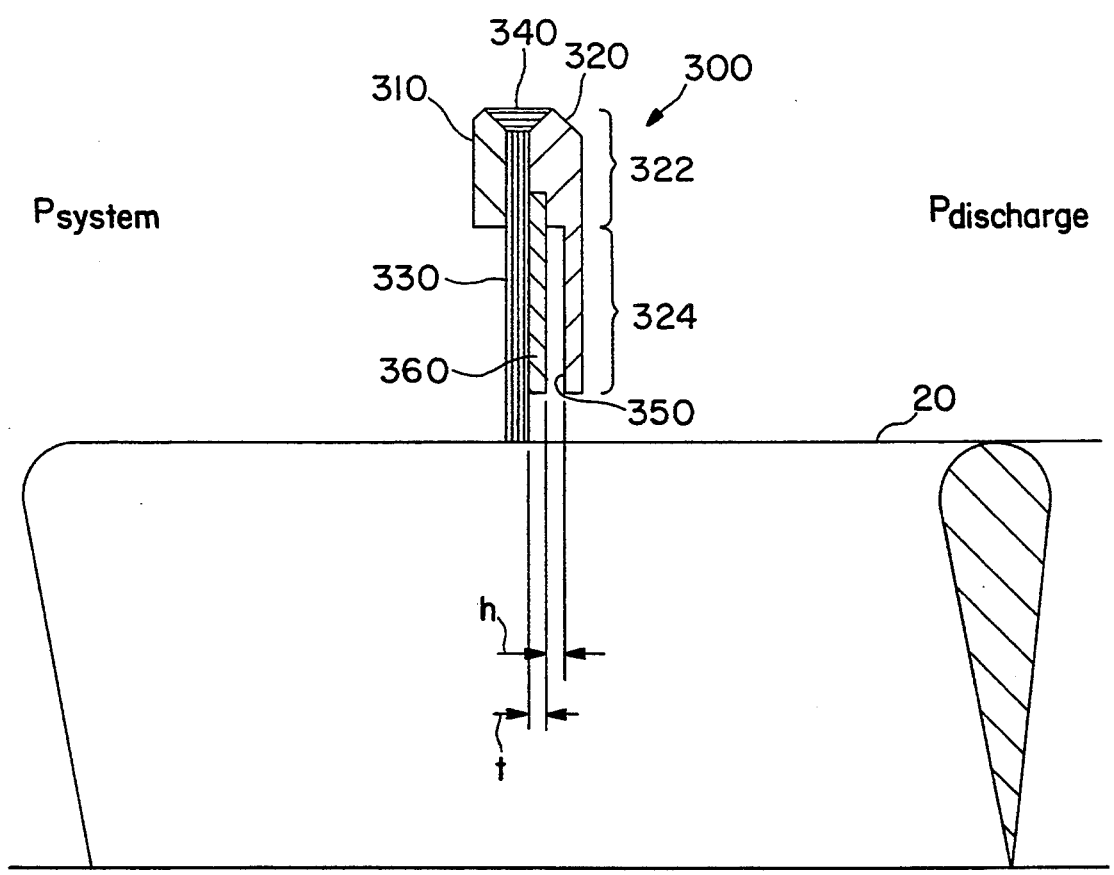
FIG. 5(A) is a radial cross-section of a brush seal device in accordance with a third embodiment of the present invention.

A third embodiment of the present invention will now be described with reference to FIGS. 5(A) and 5(B). As shown in FIG. 5(A), a brush seal device 300 is provided comprising an annular retaining plate 310 having a first side facing a system annular back plate 320 having a first side facing a discharge pressure $P_{discharge}$ and a second side opposite the first side. The second side of the back plate 320 has an outer peripheral portion 322 and an inner peripheral portion 324. A plurality of bristles 330 are secured at a weld 340 between the second side of the retaining plate 310 and the outer peripheral portion 322 of the second side of the back plate 320.

Preferably, the materials used for forming the retaining plate 310, back plate 320, bristles 330, and weld 340 are the same as those used in the first and second embodiments. Likewise, the dimensions of the retaining plate 310, back plate 320, and bristles 330 are preferably the same as those in the first and second embodiments.

As in the first embodiment, the inner peripheral portion 324 of the second side of the back plate 320 has a substantially planar recessed surface 350 formed therein. However, unlike the first embodiment, the brush seal device 300 of FIG. 5(A) further comprises a flexible annular member 360 disposed between the plurality of bristles 330 and the second side of the back plate 320.

Preferably, the flexible annular member 360 comprises a material that has a high yield strength at high temperatures such as Inconel® or other nickel based alloy. Again, it should be understood that the composition of flexible annular member 360 can be varied depending on the particular application with which the brush seal device 300 is to be used.

Figure 5B:
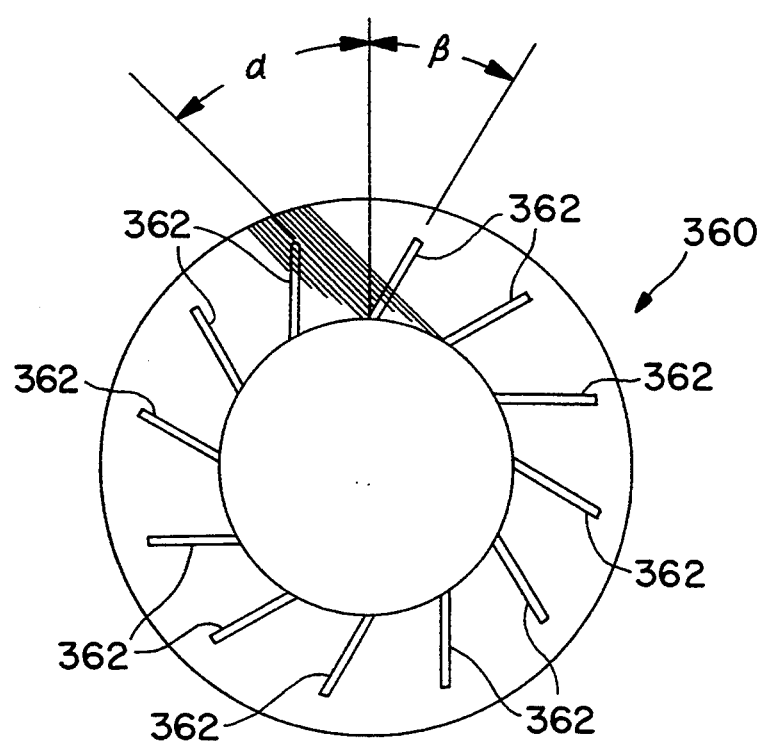
FIG. 5(B) is a frontal view of a flexible annular member of the brush seal device of FIG. 4(A).

As shown in FIG. 5(B), the flexible annular member 360 has a plurality of slots 362 formed therein to give the flexible annular member 360 increased flexibility. The slots 362 can extend at angles $\beta$ relative to respective radii of the flexible annular member 360, and can have a sense either opposite to or the same as that of the bristle angle $\alpha$. Preferably, however, the slots 362 extend along the respective radii of the flexible annular member 362.

As explained above with regard to the first embodiment, as the depth h of the recessed surface 350 is increased to reduce the contact force $F_{contact}$ on the bristles 130, the stresses on the bristle roots will also increase. However, it should be appreciated that, in this embodiment, the flexible annular member 360 will alleviate this stress concentration at the bristle roots, and hence, augment the pressure capabilities of the brush seal device 300 by distributing the root reaction force $F_{react}$ over a finite area. Further, while still allowing almost free axial movement of the bristles 330 as in the first embodiment, the flexible annular member 360 also appreciably reduces leakage of the brush seal device 300 by blocking most of the leakage through the bristles 330. It should be appreciated that flow through the tip region of the bristles 330 will remain unhindered, thereby ensuring a beneficial cooling flow at the interface between the bristles 330 and the shaft 20.

For a given design, the thickness t of the flexible annular member 360, the number of slots n formed in the flexible annular member 360, and the slot angle α can be varied to control the reaction force $F_{react}$, and hence, the root stress. The flexible member 360 can be designed with finite element analysis.

For example, the flexible annular member 360 can have a thickness t of about 0.002–0.040 inch (preferably 0.006–0.010 inch), the number of slots n can be about 5–60, and the slot angle can be between about ±70 degrees (preferably 0 degrees). It should be appreciated that, with this design, the brush seal device 300 is particularly suitable for high pressure differential applications.

It should be apparent from the foregoing that the present invention provides for a brush seal device having improved characteristics over conventional designs. In particular, the brush seal device of the present invention reduces the bristle hysteresis and stiffening effects associated with convention brush seals, thereby extending the life of the device and improving its pressure sealing capabilities.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A brush seal device for sealing a high pressure area from a low pressure area, the brush seal device comprising:
   an annular retaining plate having an inside diameter and having a first side facing the high pressure area and a second side opposite the first side;
   an annular back plate having an inside diameter less than the inside diameter of the annular retaining plate and having a first side facing the low pressure area and a second side opposite the first side, the second side of the back plate having an outer peripheral portion and an inner peripheral portion, the inner peripheral portion of the second side of the back plate having a recessed surface formed therein extending from an inner peripheral edge of the back plate outwardly to the outer peripheral portion; and
   a plurality of bristles between the second side of the retaining plate and the outer peripheral portion of the second side of the back plate, the plurality of bristles extending inwardly from the outer peripheral portion of the second side of the back plate and being oriented relative to the recessed surface to permit movement of the plurality of bristles toward the recessed surface.

2. The brush seal device of claim 1, wherein the recessed surface is configured to create a reaction force upon the plurality of bristles in a first direction when a pressure differential between the high pressure area and the low pressure area exerts a total force on the plurality of bristles in a second direction opposite the first direction.

3. The brush seal device of claim 2, wherein the reaction force is about 50–100 percent of the total force.

4. The brush seal device of claim 1, wherein the recessed surface is substantially planar.

5. The brush seal device of claim 4, wherein the recessed surface has a depth of about 0.005–0.120 inch from the second side of the back plate.

6. The brush seal device of claim 1, wherein each of the plurality of bristles has a diameter of about 0.002–0.020 inch, the plurality of bristles being arranged into about 10–60 rows between the second side of the retaining plate and the second side of the back plate with a pack width of the plurality of bristles being about 0.020–0.150 inch.

7. The brush seal device of claim 1, wherein each of the plurality of bristles has a free length of about 0.200–0.800 inch.

8. The brush seal device of claim 1, wherein the recessed surface is contoured to increase in depth toward an inner peripheral edge of the back plate.

9. The brush seal device of claim 1, further comprising a flexible annular member disposed between the plurality of bristles and the second side of the back plate.

10. The brush seal device of claim 9, wherein the flexible annular member has a plurality of slots formed therein.

11. The brush seal device of claim 10, wherein the slots extend at angles between about ±70 degrees relative to respective radii of the flexible annular member.

12. The brush seal device of claim 10, wherein the slots extend along respective radii of the flexible annular member.

13. The brush seal device of claim 9, wherein the flexible annular member has a thickness of about 0.002–0.040 inch.

14. The brush seal device of claim 1, wherein the second side of the retaining plate is substantially planar.

15. The brush seal device of claim 1, wherein an outer peripheral diameter of the recessed surface is no greater than the inside 16. An apparatus having a high pressure area and a low pressure area, the apparatus comprising:
   a rotatable shaft;
   a brush seal device for sealing the high pressure area from the low pressure area along the rotatable shaft, the brush seal device including
      an annular retaining plate having a first side facing the high pressure area and a second side opposite the first side;
      an annular back plate having an inside diameter less than the inside diameter of the annular retaining plate and having a first side facing the low pressure area and a second side opposite the first side, the second side of the back plate having an outer peripheral portion and an inner peripheral portion, the inner peripheral portion of the second side of the back plate having a recessed surface formed therein extending from an inner peripheral edge of the back plate outwardly to the outer peripheral portion; and a plurality of bristles between the second side of the retaining plate and the outer peripheral portion of the second side of the back plate, the plurality of bristles extending inwardly from the outer peripheral portion of the second side of the back plate and being oriented relative to the recessed surface to permit movement of the plurality of bristles toward the recessed surface.

17. A brush seal device for sealing a high pressure area from a low pressure area, the brush seal device comprising:

an annular retaining plate having a first side facing the high pressure area and a second side opposite the first side;

an annular back plate having a first side facing the low pressure area and a second side opposite the first side, the second side of the back plate having an outer peripheral portion and an inner peripheral portion, the inner peripheral portion of the second side of the back plate having a recessed surface formed therein extending from an inner peripheral edge of the back plate outwardly to the outer peripheral portion, the recessed surface being contoured to increase in depth toward an inner peripheral edge of the back plate; and a plurality of bristles between the second side of the retaining plate and the outer peripheral portion of the second side of the back plate, the plurality of bristles extending inwardly from the outer peripheral portion of the second side of the back plate and being oriented relative to the recessed surface to permit movement of the plurality of bristles toward the recessed surface.

18. The brush seal device of claim 17, wherein the recessed surface is configured to create a reaction force upon the plurality of bristles in a first direction when a pressure differential between the high pressure area and the low pressure area exerts a total force on the plurality of bristles in a second direction opposite the first direction.

19. The brush seal device of claim 18, wherein the reaction force is about 50–100 percent of the total force.

20. The brush seal device of claim 17, wherein each of the plurality of bristles has a diameter of about 0.002–0.020 inch, the plurality of bristles being arranged into about 10–60 rows between the second side of the retaining plate and the second side of the back plate with a pack width of the plurality of bristles being about 0.020–0.150 inch.

21. The brush seal device of claim 17, wherein each of the plurality of bristles has a free length of about 0.200–0.800 inch.

22. The brush seal device of claim 17, further comprising a flexible annular member disposed between the plurality of bristles and the second side of the back plate.

23. The brush seal device of claim 22, wherein the flexible annular member has a plurality of slots formed therein.

24. The brush seal device of claim 23, wherein the slots extend at angles between about ±70 degrees relative to respective radii of the flexible annular member.

25. The brush seal device of claim 23, wherein the slots extend along respective radii of the flexible annular member.

26. The brush seal device of claim 22, wherein the flexible annular member has a thickness of about 0.002–0.040 inch.

27. The brush seal device of claim 17, wherein the second side of the retaining plate is substantially planar.

28. The brush seal device of claim 17, wherein an outer peripheral diameter of the recessed surface is no greater than an inside diameter of the retaining plate.

29. An apparatus having a high pressure area and a low pressure area, the apparatus comprising:

a rotatable shaft;

a brush seal device for sealing the high pressure area from the low pressure area along the rotatable shaft, the brush seal device including an annular retaining plate having a first side facing the high pressure area and a second side opposite the first side;

an annular back plate having a first side facing the low pressure area and a second side opposite the first side, the second side of the back plate having an outer peripheral portion and an inner peripheral portion, the inner peripheral portion of the second side of the back plate having a recessed surface formed therein extending from an inner peripheral edge of the back plate outwardly to the outer peripheral portion, the recessed surface being contoured to increase in depth toward an inner peripheral edge of the back plate; and a plurality of bristles between the second side of the retaining plate and the outer peripheral portion of the second side of the back plate, the plurality of bristles extending inwardly from the outer peripheral portion of the second side of the back plate and being oriented relative to the recessed surface to permit movement of the plurality of bristles toward the recessed surface.

30. A brush seal device for sealing a high pressure area from a low pressure area, the brush seal device comprising:

an annular retaining plate having a first side facing the high pressure area and a second side opposite the first side;

an annular back plate having a first side facing the low pressure area and a second side opposite the first side, the second side of the back plate having an outer peripheral portion and an inner peripheral portion, the inner peripheral portion of the second side of the back plate having a recessed surface formed therein extending from an inner peripheral edge of the back plate outwardly to the outer peripheral portion;

a plurality of bristles between the second side of the retaining plate and the outer peripheral portion of the second side of the back plate, the plurality of bristles extending inwardly from the outer peripheral portion of the second side of the back plate and being oriented relative to the recessed surface to permit movement of the plurality of bristles toward the recessed surface; and a flexible annular member disposed between the plurality of bristles and the second side of the back plate.

31. The brush seal device of claim 30, wherein the recessed surface is configured to create a reaction force upon the plurality of bristles in a first direction when a pressure differential between the high pressure area and the low pressure area exerts a total force on the plurality of bristles in a second direction opposite the first direction.

32. The brush seal device of claim 31, wherein the reaction force is about 50–100 percent of the total force.

33. The brush seal device of claim 30, wherein the recessed surface is substantially planar.

34. The brush seal device of claim 33, wherein the recessed surface has a depth of about 0.005–0.120 inch from the second side of the back plate.

35. The brush seal device of claim 30, wherein each of the plurality of bristles has a diameter of about 0.002–0.020 inch, the plurality of bristles being arranged into about 10–60 rows between the second side of the retaining plate and the second side of the back plate with a pack width of the plurality of bristles being about 0.020–0.150 inch.

36. The brush seal device of claim 30, wherein each of the plurality of bristles has a free length of about 0.200–0.800 inch.

37. The brush seal device of claim 30, wherein the flexible annular member has a plurality of slots formed therein.

38. The brush seal device of claim 37, wherein the slots extend at angles between about ±70 degrees relative to respective radii of the flexible annular member.

39. The brush seal device of claim 37, wherein the slots extend along respective radii of the flexible annular member.

40. The brush seal device of claim 30, wherein the flexible annular member has a thickness of about 0.002–0.040 inch.

41. The brush seal device of claim 30, wherein the second side of the retaining plate is substantially planar.

42. The brush seal device of claim 30, wherein an outer peripheral diameter of the recessed surface is no greater than an inside diameter of the retaining plate.

43. An apparatus having a high pressure area and a low pressure area, the apparatus comprising:
 a rotatable shaft;
 a brush seal device for sealing the high pressure area from the low pressure area along the rotatable shaft, the brush seal device including
  an annular retaining plate having a first side facing the high pressure area and a second side opposite the first side;
  an annular back plate having a first side facing the low pressure area and a second side opposite the first side, the second side of the back plate having an outer peripheral portion and an inner peripheral portion, the inner peripheral portion of the second side of the back plate having a recessed surface formed therein extending from an inner peripheral edge of the back plate outwardly to the outer peripheral portion;
 a plurality of bristles between the second side of the retaining plate and the outer peripheral portion of the second side of the back plate, the plurality of bristles extending inwardly from the outer peripheral portion of the second side of the back plate and being oriented relative to the recessed surface to permit movement of the plurality of bristles toward the recessed surface; and
 a flexible annular member disposed between the plurality of bristles and the second side of the back plate.

* * * * *

UNITED STATES PATENT AND TRADEMARK OFFICE
CERTIFICATE OF CORRECTION

PATENT NO. : 5,401,036
DATED : March 23, 1995
INVENTOR(S) : Prithwish BASU

It is certified that error appears in the above-identified patent and that said Letters Patent is hereby corrected as shown below:

Claim 15, col. 8, line 56, after "inside," insert --diameter of the retaining plate--.

Claim 24, col. 10, line 1, delete "," (second occurrence).

Signed and Sealed this

Thirtieth Day of May, 1995

Attest:

BRUCE LEHMAN

Attesting Officer Commissioner of Patents and Trademarks